US010065878B2

(12) United States Patent
Faccioli

(10) Patent No.: US 10,065,878 B2
(45) Date of Patent: Sep. 4, 2018

(54) METHOD AND FACILITY FOR THE FORCED DEWATERING OF A SLUDGE OF SALINE RESIDUES

(71) Applicant: DEGREMONT, Paris la Defense (FR)

(72) Inventor: Jean-Michel Faccioli, Paris (FR)

(73) Assignee: DEGREMONT (FR)

(*) Notice: Subject to any disclaimer, the term of this patent is extended or adjusted under 35 U.S.C. 154(b) by 0 days.

(21) Appl. No.: 14/892,913

(22) PCT Filed: May 19, 2014

(86) PCT No.: PCT/IB2014/061534
§ 371 (c)(1),
(2) Date: Nov. 20, 2015

(87) PCT Pub. No.: WO2014/188323
PCT Pub. Date: Nov. 27, 2014

(65) Prior Publication Data
US 2016/0115064 A1 Apr. 28, 2016

(30) Foreign Application Priority Data
May 21, 2013 (FR) ...................................... 13 54528

(51) Int. Cl.
B01D 21/01 (2006.01)
B01D 25/00 (2006.01)
(Continued)

(52) U.S. Cl.
CPC .............. C02F 11/122 (2013.01); B30B 9/04 (2013.01); B30B 9/06 (2013.01); B30B 9/262 (2013.01);
(Continued)

(58) Field of Classification Search
CPC ....... C02F 11/122; C02F 11/128; C02F 11/14; C02F 11/12; C02F 11/121; C02F 1/66;
(Continued)

(56) References Cited

U.S. PATENT DOCUMENTS 3,207,064 A 9/1965 Hauser-Bucher
5,143,628 A 9/1992 Bott et al.
(Continued)

FOREIGN PATENT DOCUMENTS

CN 101643308 2/2010
WO 2014178028 11/2014

OTHER PUBLICATIONS

Corresponding International Search Report for PCT/IB2014/061534 dated Aug. 20, 2014.

Primary Examiner — Claire A Norris
Assistant Examiner — Julia L. Wun
(74) Attorney, Agent, or Firm — The Belles Group, P.C.

(57) ABSTRACT

A method for the forced dewatering, by pressing, of saline residues produced by drinking water production, or by the treatment of municipal or industrial wastewaters, in which method the saline residues are introduced into the cylinder (12a) of a piston press (12) comprising flexible drains (12e) formed by flexible sheaths from a material that is permeable to liquid but impermeable to solids, each drain (12e) comprising an inner passage that opens into an associated opening (12g), the press operating in batches, and characterized in that during pressing, the piston carries out reciprocal movements and applies alternating and variable pressures to the sludge, while the flexible drains are deformed, the liquid pressed out from the product passing through the wall of the drains and being discharged as a filtrate, while the dewatered sludge remains outside the drains and is discharged by opening the press.

6 Claims, 4 Drawing Sheets

(51) Int. Cl.
*C02F 1/00* (2006.01)
*B30B 9/02* (2006.01)
*B30B 1/00* (2006.01)
*C02F 11/12* (2006.01)
*B30B 9/06* (2006.01)
*B30B 9/04* (2006.01)
*B30B 9/26* (2006.01)
*C02F 11/14* (2006.01)
*F26B 5/14* (2006.01)
*C02F 1/44* (2006.01)
*C02F 1/56* (2006.01)
*C02F 1/66* (2006.01)
*C02F 103/08* (2006.01)
*C02F 101/10* (2006.01)

(52) U.S. Cl.
CPC ............ *C02F 11/128* (2013.01); *C02F 11/14* (2013.01); *F26B 5/14* (2013.01); *C02F 1/004* (2013.01); *C02F 1/441* (2013.01); *C02F 1/56* (2013.01); *C02F 1/66* (2013.01); *C02F 2101/10* (2013.01); *C02F 2103/08* (2013.01); *F26B 2200/18* (2013.01)

(58) Field of Classification Search
CPC .. C02F 1/56; C02F 1/441; C02F 1/004; C02F 2101/10; C02F 2103/08; B30B 9/04; B30B 9/262; B30B 9/06; B30B 9/18; B30B 9/26; F26B 5/14; F26B 2200/18; B01D 25/32
USPC ....... 210/724, 770, 224, 234, 225, 780, 808, 210/767; 100/107, 37, 126, 127, 116, 100/125, 251, 226, 240, 104, 110
See application file for complete search history.

(56) References Cited

U.S. PATENT DOCUMENTS

| | | | |
|---|---|---|---|
| 6,797,195 B1* | 9/2004 | Kreisler | C02F 1/54 210/710 |
| 6,805,803 B1* | 10/2004 | Weir | C02F 1/56 210/728 |
| 2010/0199514 A1 | 8/2010 | Camisa | |
| 2012/0313038 A1* | 12/2012 | Laros | C02F 11/14 252/194 |

* cited by examiner

METHOD AND FACILITY FOR THE FORCED DEWATERING OF A SLUDGE OF SALINE RESIDUES

PRIORITY

Priority is claimed as a national stage application, under 35 U.S.C. § 371, to international patent application No. PCT/IB2014/061534, filed May 19, 2014, which claims priority to French patent application 1354528, filed May 21, 2013. The disclosures of the aforementioned priority applications are incorporated herein by reference in their entirety.

The present invention relates to a process for the extensive dewatering, by pressing, of a sludge of saline residues, resulting from drinking water production, or from treatment of municipal or industrial wastewaters.

The field of the invention is the dewatering of a sludge resulting from the treatment of a saline effluent, in the case of drinking water production, or from treatment of municipal or industrial wastewaters. This invention can be applied, in particular, to drinking water production facilities using a seawater desalination process.

At a time when environmental preoccupations are becoming very significant and when it is sought to save fossil energy, the extensive dewatering of sludge must be considered with interest. Extensive dewatering is dewatering which makes it possible to obtain high levels of dryness, of at least 30%, and to reduce costs associated with transporting dewatered sludge to a Sanitary Landfill Site.

In a process for dewatering a sludge, the conditioning of the sludge with a polyelectrolyte and the implementation of pressing are important steps for obtaining optimal efficiency of the process.

The objective of the invention is, especially, to provide a process which makes it possible to ensure extensive dewatering and to obtain high levels of dryness, of at least 30%, although the sludge comes from saline residues. The dryness of the sludge to be dewatered, when entering the pressing, is about a few percent, generally from 2% to 10%. It is also desirable for the energy consumption to be limited for performing the dewatering.

According to the invention, the process for extensive dewatering, by pressing, of saline residues resulting from drinking water production, or from treatment of municipal or industrial wastewaters, is characterized in that the saline residues are introduced into the cylinder of a piston press comprising flexible drains formed by flexible sheaths made from a material that is permeable to liquid but impermeable to solids, each drain comprising an inner passage that opens into an associated opening, the pressing operating in batches (i.e. batchwise), and in that, during the pressing, the piston carries out reciprocal movements and applies alternating and variable pressures to the sludge, while the flexible drains are deformed, the liquid pressed out from the product passing through the wall of the drains and being discharged as a filtrate, while the dewatered sludge remains outside the drains and is discharged by opening the press. A renewal of the interfaces between the sludge and the filtering wall of the drains takes place within the press. The dewatered sludge leaving the press has a dryness of greater than 30%, preferably greater than 35%.

The invention makes it possible to obtain, despite the presence of salts, a sludge of saline residues which has a high dryness, greater than that of about 22% obtained with centrifuges, with a relatively low energy consumption.

The difficulty in finding a destination for a dewatered sludge with a high salt concentration, while minimizing the environmental impact, should be noted. The objective of the invention is also to reduce the salt concentration of the dewatered sludge. For this, the quality of the sludge is modified, during the operating cycle of the piston press, by introducing an amount of drinking water which has optionally had a strongly alkaline reagent, in particular at a pH greater than 11, added to it, in order to obtain a dewatered sludge that is less polluting for the environment and/or to obtain a composition of the filtrate, resulting from the dewatering, for which discharge into the natural environment can be considered.

Advantageously, the process according to the invention is characterized in that an injection of drinking water is carried out, during the dewatering cycle or during the phase of filling the piston press with sludge, according to a dosage sufficiently high to reduce the salt concentration of the dewatered sludge while preserving a high dryness.

The injection of drinking water can be carried out according to a volume of between 50% and 150% of the volume of the sludge subjected to a dewatering cycle. The volume of water is generally injected in several fractions, the total of which corresponds to the desired volume.

Preferably, an injection of drinking water is carried out during the phase of filling the piston press with sludge, according to a predetermined dosage in order to optimize the initial flocculation of a sludge, with a polyelectrolyte, through the intimate action of the polymer on the particles in suspension in this sludge. This action of the polymer is promoted by the action of the press piston.

The injection of drinking water can be carried out according to a dosage of between 50% and 150% of the volume of the sludge subjected to a dewatering cycle of the press.

It is possible to carry out an injection of drinking water to which a strongly alkaline reagent has been added, during the dewatering process, according to a sufficiently high dosage, in order to precipitate the metals from the dewatered sludge, and to increase the final dryness of the dewatered sludge to a value of greater than 35%.

The invention also relates to a facility for carrying out a process as defined previously, characterized in that it comprises means for introducing the saline residues into the cylinder of a piston press comprising flexible drains, means for causing the piston to carry out reciprocal movements and for applying alternating and variable pressures to the sludge, while the flexible drains are deformed, means for discharging the liquid which is pressed out and which passes through the wall of the drains and means for opening the press in order to discharge the dewatered sludge.

Apart from the arrangements set out above, the invention consists of a certain number of other arrangements to which reference will more explicitly be made hereinafter with respect to an exemplary embodiment described with reference to the appended drawings, but which is in no way limiting. On these drawings.

Figure 1:
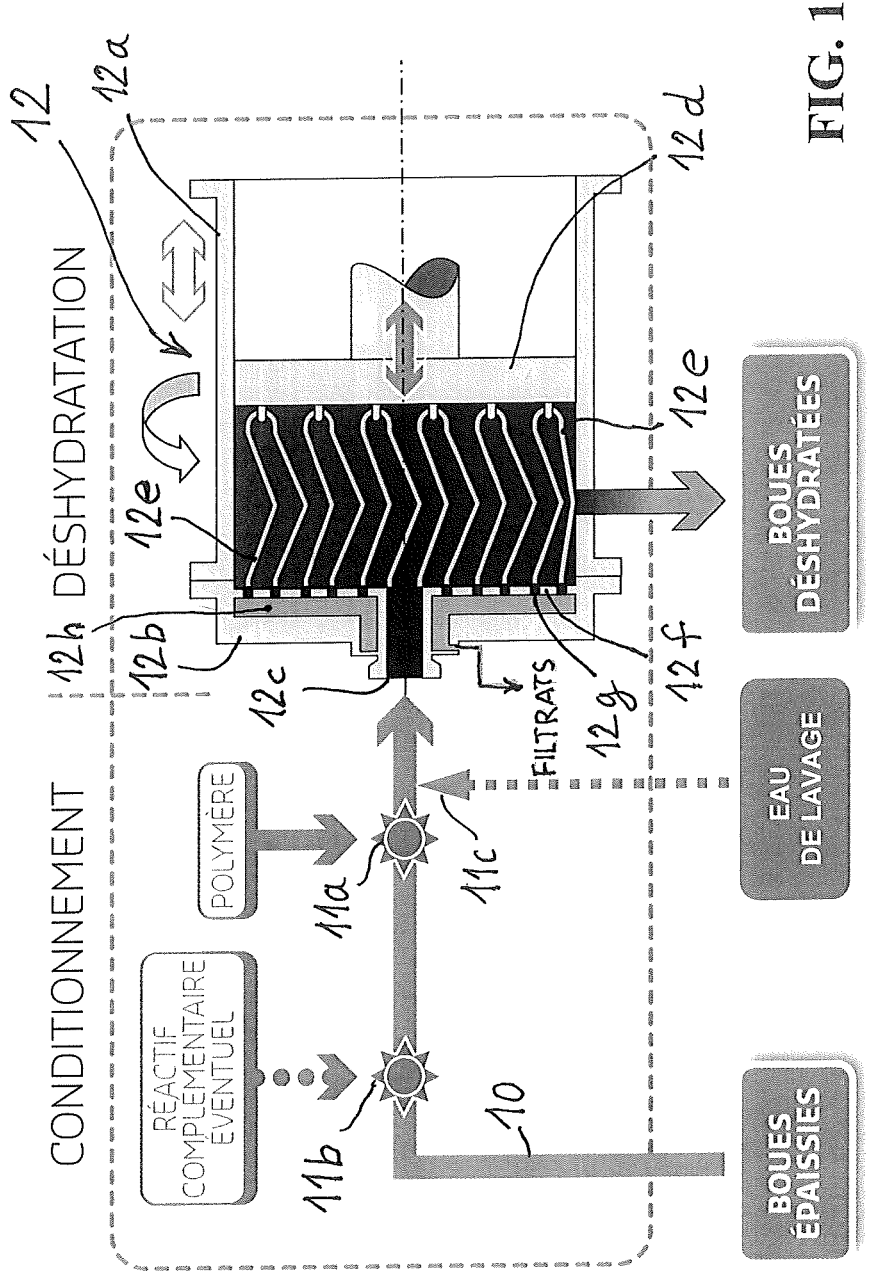
FIG. 1 is a diagram of a facility for extensive dewatering by means of a piston press, according to the invention.

The sludge treated by means of the process of the invention may have a salinity of between 5 g/l, corresponding to brackish water, and 50 g/l. As can be seen on FIG. 1, the sludge of saline residues, preferably thickened at a dryness of 2% to 10%, arrives via a pipe 10 which comprises a connection 11a for an optional injection of polymer, a connection 11b for an optional injection of additional reagent, and a connection 11c for an injection of washing water. The pipe 10 is connected, downstream of said connections, to the inlet channel 12c of a piston 12d press 12.

Figures 2, 3, 4:
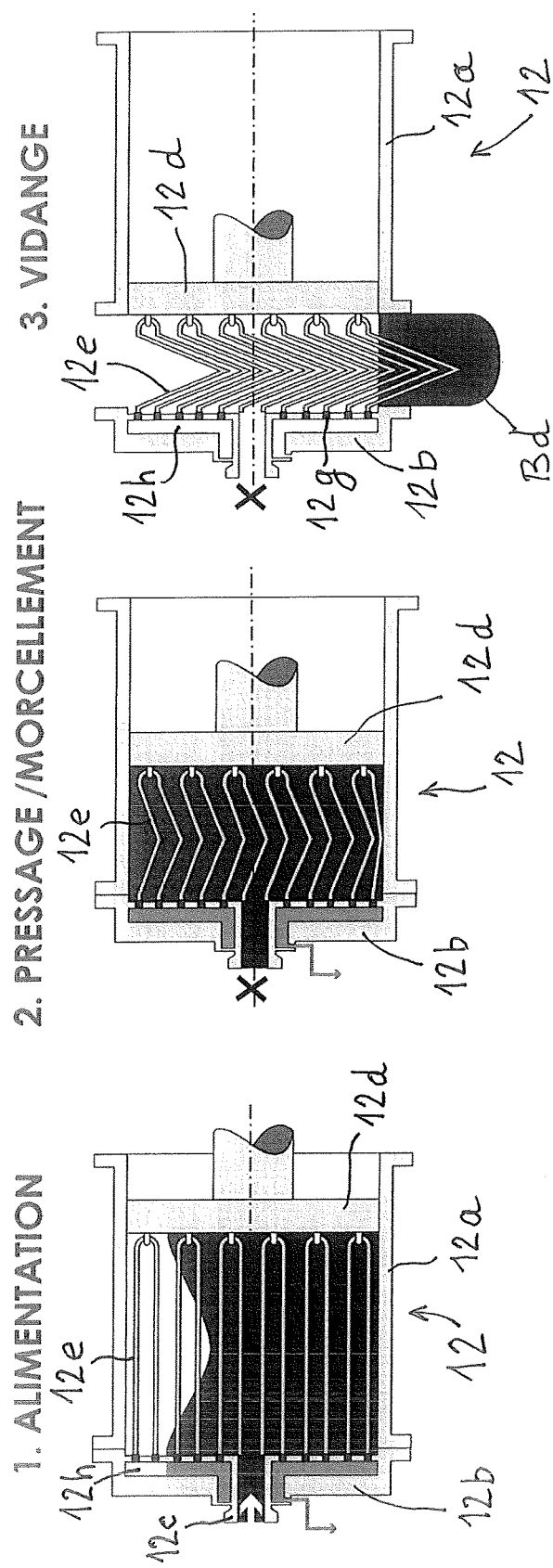
FIGS. 2 to 4 illustrate the three phases of the dewatering cycle of the piston press.

The press 12 comprises a cylinder 12a, one end of which, located on the left according to FIG. 1-FIG. 4, is sealed closed by a plate 12b, which can be set apart therefrom according to the axial direction as illustrated on FIG. 4.

The product to be pressed is introduced into the cylinder 12a via the inlet channel 12c provided at the center of the plate 12b. At a distance from the plate 12b, the piston 12d, subjected to a hydraulic or pneumatic pressure, can slide in a sealed manner in the cylinder 12 in order to perform pressing of the products introduced into the cylinder 12. Drainage elements, or drains 12e, formed by flexible sheaths made from a material that is permeable to liquid but impermeable to solids, are attached to a counter plate 12f set apart from the plate 12b, but linked thereto. Each drain 12e comprises an inner passage that opens into an associated opening 12g, made in the counter plate 12f. The openings 12g communicate with a chamber 12h, included between the counter plate 12f and the plate 12b. The chamber 12h receives the liquid, essentially water, constituting the filtrate discharged to the outside.

Opposite the counter plate 12f, the drains 12e are linked to the piston 12d. The drains 12e extend substantially parallel to the geometric axis of the cylinder 12a when the piston is at the maximum distance from the plate 12b.

During the pressing, the piston 12d carries out reciprocal movements along the direction of the axis of the cylinder 12a, while the plate 12b is maintained against the end of the cylinder 12a. The flexible drains 12e are deformed; the liquid pressed out from the product passes through the wall of the drains 12e and is discharged from the chamber 12h. During the pressing operation, the cylinder 12a, the piston 12d and the plates 12b, 12f are also driven rotationally about the geometric axis of the cylinder 12a.

When the pressing has ended, the pressed sludge Bd is discharged as illustrated on FIG. 4. The plate 12b is shifted so as to allow opening of the chamber; the piston 12d is brought to the end of the cylinder 12a turned toward the plate 12b. The pressed material Bd escapes by gravity into the space thus freed, while the drains 12e take on a V-shaped configuration.

The process operates in batches, i.e. "batchwise", according to three phases:

feeding the press with sludge, as illustrated on FIG. 2, pressing and dividing into pieces, as illustrated on FIG. 3, and emptying of the dewatered sludge Bd, as illustrated on FIG. 4.

Generally, several feeding and pressing phases are carried out before an emptying phase.

Figure 5:
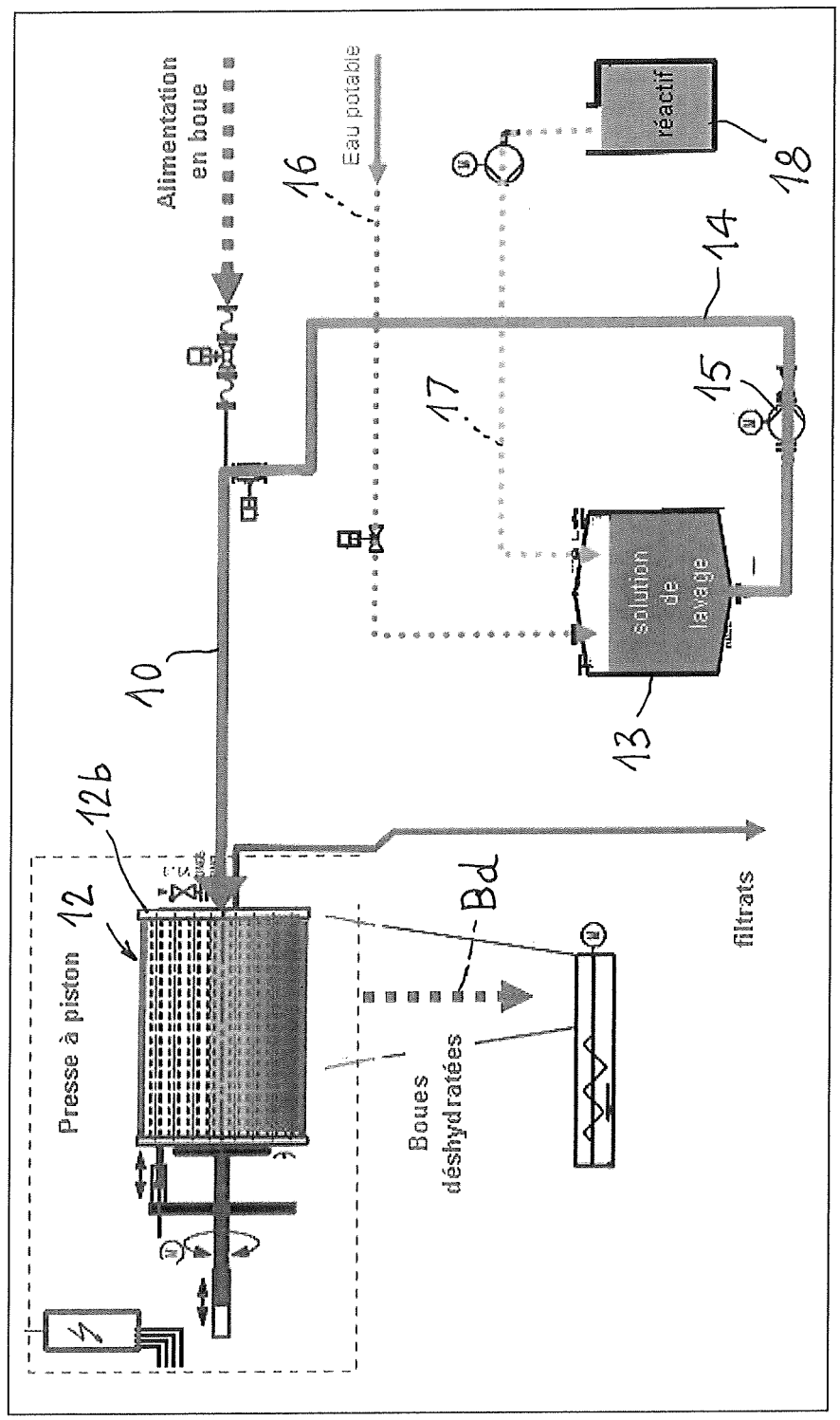
FIG. 5 is a diagram of the system for injecting water into the piston pump, optionally with addition of a strongly alkaline reagent.

The diagram of FIG. 5 illustrates a circuit for the injection of a solution for washing of the piston press 12, represented in a left/right reversed position compared with FIGS. 1-4. A washing solution, based on drinking water, is contained in a tank 13. A pipe 14, to which a pump 15 is fitted, is connected to the pipe for feeding the press 12. Starting the pump 15 makes it possible to inject water into the press 12. A pipe 16 feeds the tank 13 with drinking water, while a pipe 17 makes it possible to inject into the tank 13 an alkaline reagent pumped into a tank 18.

An injection of drinking water to the moving press 12, during the phase of filling with sludge, makes it possible to complete the process of flocculation of the sludge using a polymer, by optimizing the electrochemical action of the polyelectrolyte on the particles in suspension in the sludge, thereby improving the liquid-solid separation and the dryness of the sludge resulting from the dewatering.

The injection of drinking water makes it possible to reduce the salt concentration of the sludge after dewatering. The salts are passed into the filtrate. Discharging of the filtrate into the natural environment, in particular into the sea, can be considered, in accordance with the environmental legislation in force.

Comparative tests were carried out:
dewatering without washing;
dewatering with washing with drinking water at the end of the filling phase;
dewatering with washing with drinking water with strongly alkaline reagent (pH greater than or equal to 11) at the end of the filling phase.

The amount of sludge accepted into the piston press is expressed in kg solids (kilograms of solids). The sludge volume can be deduced from the solids content of the sludge, which is about 35 g/l, i.e. a sludge volume of approximately 350 l for 12.2 kg solids.

The results obtained are the following:

| Test protocol | Amount of sludge accepted into the press (kg solids) | Amount of drinking water injected (liters) | Dryness of the dewatered sludge (%) | Electrical conductivity (mS/cm) of the sludge after dewatering |
|---|---|---|---|---|
| Dewatering without washing carried out | 12.2 | 0 | 36.8 | >10 |
| Dewatering with washing with drinking water at the end of the filling phase | 12.2 | 400 | 40.3 | >5 |
| Dewatering with washing with drinking water with strongly alkaline reagent at the end of the filling phase | 14.62 | 500 | 48 | <1 |

These results were obtained with the same sludge feed made up of a residue from a treatment for desalination of seawater, the salinity of which is 36.5 g/l.

The washing makes it possible to improve the dryness, probably by promoting the action of the polymer and the flocculation, and makes it possible to reduce the salinity of the dewatered sludge, as indicated by the drop in electrical conductivity in the right-hand column of the table above.

Figure 6:
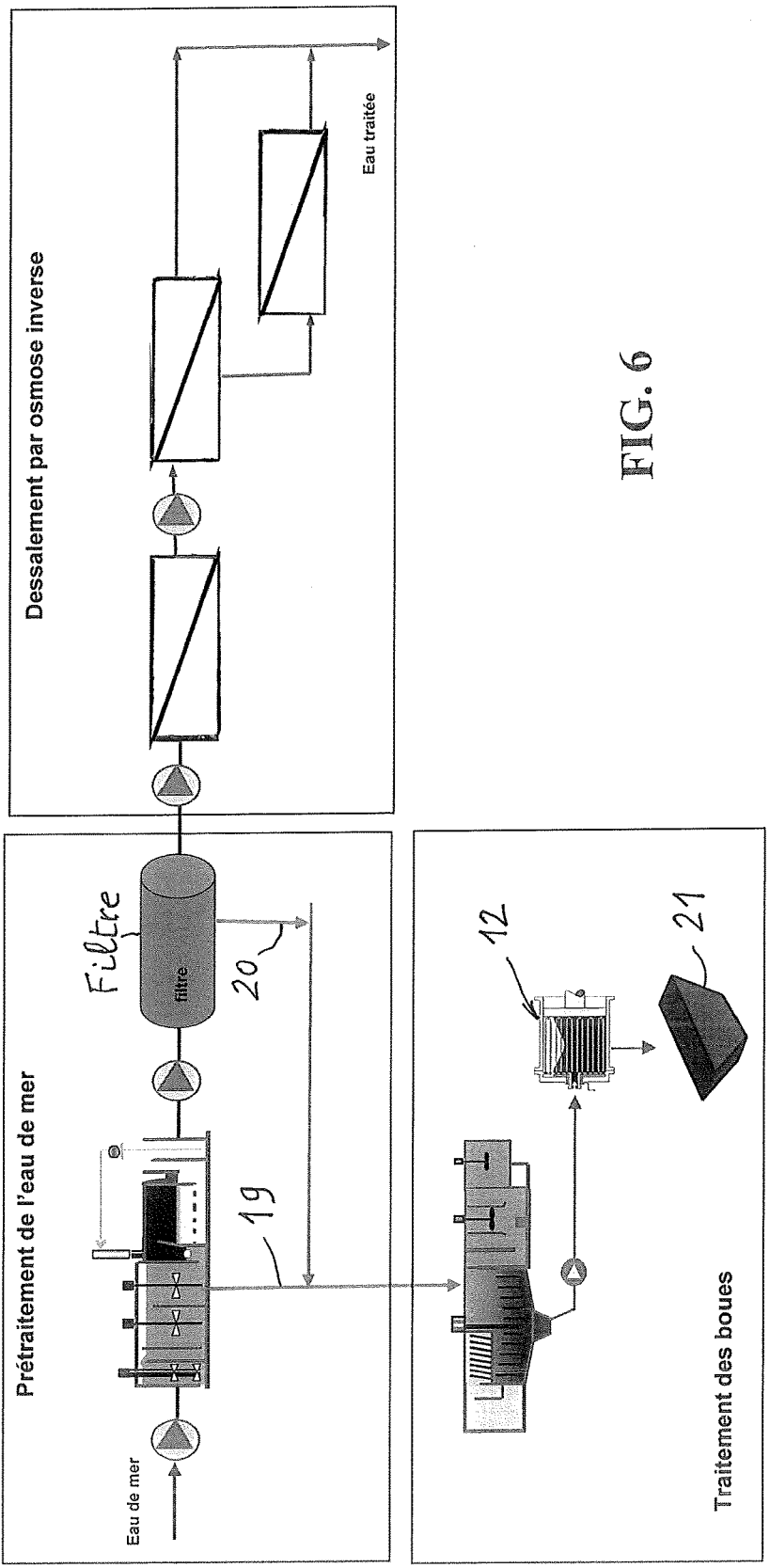
FIG. 6 is a diagram of a facility for seawater desalination by reverse osmosis.

The invention can be applied to drinking water production facilities using a seawater desalination process, in particular to a facility for seawater desalination by reverse osmosis, represented on FIG. 6. The pretreatment of the seawater generates sludge which is directed, via pipes 19, 20, to a sludge treatment comprising the piston press 12. The dewatered sludge is recovered in a skip 21 so as to be discharged.

The dewatering, according to the process of the invention, can be carried out with or without addition of polymer, and with or without addition of lime or of alkaline reagent.

INDUSTRIAL APPLICATIONS

The extensive dewatering process and its washing device according to the invention can be applied when the discharging of waste with a high salt concentration into the sea is prohibited or regulated and the outlet for a sludge resulting from treatment of saline effluent is a Sanitary Landfill Site, the class of which will depend on the salinity of the product accepted.

The high dryness will significantly reduce the production of GHGs (greenhouse gases) resulting from the road transport of the sludge to the Sanitary Landfill Site when said site is at a distance from the treatment factory producing a residue with a high salt concentration.

The invention claimed is:

1. A process for the extensive dewatering, by pressing, of a sludge of saline residues resulting from drinking water production, or from treatment of municipal or industrial wastewaters, comprising:
introducing a batch of the sludge of the saline residues in a filling phase into the cylinder of a piston press comprising flexible drains, a piston, and a counter plate positioned opposite the piston, said sludge having a salinity of between 5 g/l and 50 g/l, each drain comprising a flexible sheath made from a material that is permeable to liquid but impermeable to solids, each flexible sheath forming an inner passage that opens into one of a plurality of openings formed in the counter plate, the openings providing fluidic communication between the inner passages of the sheaths and a chamber formed between the counter plate and an end plate;
pressing the sludge in a dewatering cycle, during which the piston of the piston press carries out reciprocal movements and applies alternating and variable pressures to the sludge, while the flexible drains are deformed, the liquid pressed out of the sludge passing into the inner passages through walls of the drains and being discharged as a filtrate, while the dewatered sludge remains outside the inner passages of the drains;
injecting drinking water into the cylinder at an end of the filling phase or during the dewatering cycle; and
discharging the pressed sludge by opening the press, wherein the pressed sludge leaving the press has a dryness of greater than 30%,
wherein the drinking water is injected into the cylinder in a sufficiently high dosage that reduces the salt concentration of the dewatered sludge while preserving a high dryness of the dewatered sludge.

2. The process as claimed in claim 1, wherein the pressed sludge leaving the press has a dryness of greater than 35%.

3. The process as claimed in claim 1, wherein the injection of drinking water is carried out according to a volume of between 50% and 150% of the volume of the sludge subjected to a dewatering cycle.

4. The process as claimed in claim 1, wherein the drinking water is injected into the cylinder at the end of the filling stage according to a predetermined dosage in order to optimize the initial flocculation of a sludge, with a polyelectrolyte, through the intimate action of the polymer on the particles in suspension in this sludge.

5. The process as claimed in claim 4, wherein the injection of drinking water is carried out according to a dosage of between 50% and 150% of the volume of the sludge subjected to a dewatering cycle of the press.

6. The process as claimed in claim 1, wherein the drinking water is injected into the cylinder at the end of the filling stage, the drinking water, having a strongly alkaline reagent added thereto, being injected according to a sufficiently high dosage in order to precipitate the metals from the dewatered sludge and increase the final dryness of the dewatered sludge.

* * * * *